No. 748,439. PATENTED DEC. 29, 1903.
R. TWOHIG.
GARDEN IMPLEMENT.
APPLICATION FILED AUG. 7, 1903.
NO MODEL.

WITNESSES:
Paul Hunter
R. B. Cavanagh

INVENTOR
Redmond Twohig
BY
ATTORNEYS

No. 748,439. Patented December 29, 1903.

UNITED STATES PATENT OFFICE.

REDMOND TWOHIG, OF SALINA, KANSAS.

GARDEN IMPLEMENT.

SPECIFICATION forming part of Letters Patent No. 748,439, dated December 29, 1903.

Application filed August 7, 1903. Serial No. 168,604. (No model.)

*To all whom it may concern:*

Be it known that I, REDMOND TWOHIG, a citizen of the United States, and a resident of Salina, in the county of Saline and State of Kansas, have invented new and useful Improvements in Garden Implements, of which the following is a full, clear, and exact description.

My invention relates to certain novel and useful improvements in garden implements, and has particular application to an improved means of securing pitchforks, hoes, rakes, and similar tools to their handles.

In the present instance I have particularly in view as an object the provision of means for securing the tools to the handle in such manner that there will be no possibility of the parts separating accidentally, thereby obviating the loss of time and the liability to injury.

A further object of my invention is to provide a device of the character described which shall embody the essential and desired features of simplicity, durability, convenience, and inexpensiveness.

To the accomplishment of the above-recited ends and others of a similar nature my invention consists in the construction and arrangement of parts as is described in this specification, delineated in the accompanying drawings, and set forth in the appended claims.

Reference is to be had to the accompanying drawings, forming a part of this specification, in which similar characters of reference indicate corresponding parts in both the figures.

Figure 1:
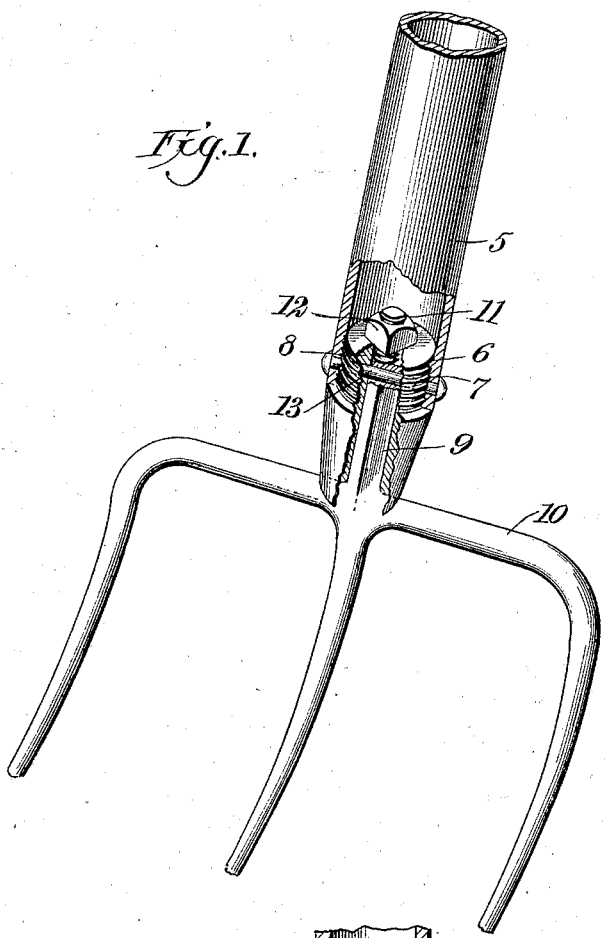
Figure 2:
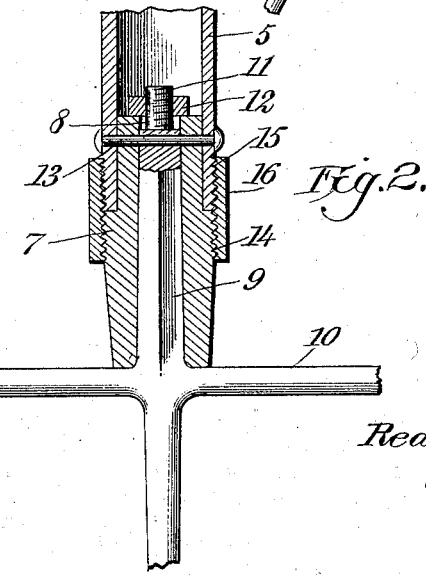

Figure 1 is a perspective view of an implement provided with my improvements; and Fig. 2 is a longitudinal sectional view of the handle and socket portion of the tool, showing the manner of securing the tool to its handle.

Referring now to the accompanying drawings in detail, 5 designates the handle portion of any tool—such as a pitchfork, hoe, rake, or the like—said handle being of tubular construction and preferably formed of metal.

In Fig. 1 I have shown the lower interior end portion of the handle as provided with a series of threads 6, and into such lower end portion is designed to be threaded a socket 7, a longitudinally-bored portion 8 of the socket being adapted to have passed therethrough the square tang 9 of the pitchfork 10. The tang of the implement extends a slight distance beyond the inner end of the socket and is formed with a short stud 11, upon which is threaded a nut 12. It is to be noted by this construction that the implement is rigidly held within the handle; but in order to give additional security I provide the handle, socket, and tang with lateral registering apertures or bores, through which passes a rivet-bolt 13, so that the tool portion of the device will be reinforced and additional security be given.

In Fig. 2 of the drawings the construction is very similar to Fig. 1; but in this instance the exterior of the adjoining portions of the socket and the handle are threaded, as shown at 14 and 15, to receive the coupling-ring 16, thus giving additional rigidity to the joint.

It will be noted from the above description that I have provided an exceedingly simple means for joining tools to handles and one which presents but little liability of permitting the separation of the parts. This construction will be found especially useful in pitchforks or similar implements, particularly when used in working with threshing-machines or the like, as heretofore the separation of the body of the implement from the handle when used in such instances has often resulted in serious accidents.

Having thus described my invention, I claim as new and desire to secure by Letters Patent—

1. The combination of a tubular handle, a socket threaded within the handle, a tool formed with a tang portion inserted within the socket and extended slightly beyond the inner end of the same, the end of said tang being formed with threads, a nut screwed upon the threaded portion of the tang and bearing upon the socket, and a rivet-bolt passing through the handle, the socket and the tang, substantially as set forth.

2. The combination of a tubular handle, a socket threaded within the handle, a tool formed with a tang portion inserted within the socket and extended slightly beyond the inner end of the same, the end of said tang being formed with threads, a nut screwed upon the threaded portion of the tang and bearing upon the socket, a rivet-bolt passing through the handle, the socket, and the tang, and a coupling joining the socket and the handle, substantially as set forth.

In testimony whereof I have signed my name to this specification in the presence of two subscribing witnesses.

REDMOND TWOHIG.

Witnesses:
W. P. CRAVENS,
E. L. NEPTUNE.